June 9, 1959 L. M. FRIEDMANN ET AL 2,890,281
TELEPHONE ALARM SYSTEM
Filed Sept. 27, 1954
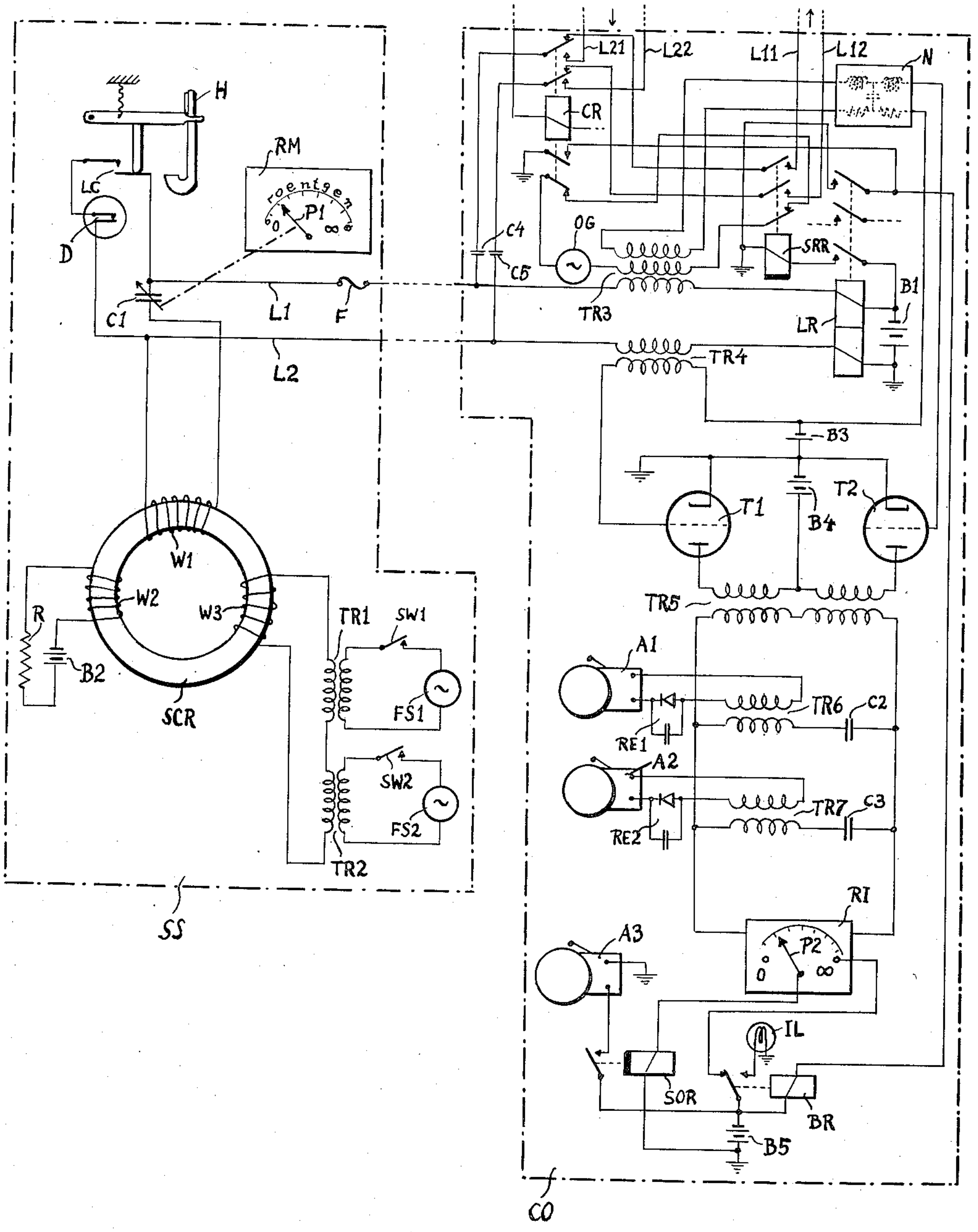
LOUIS M. FRIEDMANN
KARL F. ROSS
*INVENTORS.*
*BY*
Karl F. Ross
AGENT

United States Patent Office 2,890,281

Patented June 9, 1959

2,890,281

TELEPHONE ALARM SYSTEM

Louis Martin Friedmann and Karl Frank Ross, New York, N.Y.

Application September 27, 1954, Serial No. 458,482

8 Claims. (Cl. 179—5)

Our present invention relates to long-distance alarm systems adapted to use existing telephone lines or the like.

In our co-pending application Ser. No. 387,979, filed October 23, 1953, now Patent No. 2,690,477, issued September 28, 1954, we have disclosed an alarm system wherein a capacitive shunt is bridged across a telephone line at a subscriber station, this shunt offering an infinite resistance to direct-current signals transmitted over the line but providing a path of finite resistance for alternating current originating at a central office or exchange; when the line is either cut or short-circuited, the disappearance or the abnormal rise in the amplitude of this alternating current actuates an alarm to indicate the emergency condition.

In our prior system, accordingly, only two extreme current values (zero and maximum amplitude) are used to indicate certain off-normal line conditions. In contradiction thereto, it is the general object of the present invention to utilize the intervening range of alternating-current amplitudes for the purpose of transmitting a warning or an alarm, especially in a situation not involving an off-normal condition (break or short circuit) of the line itself.

A more specific object of our invention is to provide means for transmitting an alarm signal or, preferably, a variety of such signals over a telephone line in the quiescent condition of the latter and independently of the usual dialing and supervisory signals.

Another specific object of this invention is to provide means for automatically and substantially continuously transmitting over the line, at least in its quiescent state, a signal responsive to certain environmental conditions at the outlying or subscriber station, e.g. a signal indicative of the intensity of incident radiation at such station.

An important feature of our invention resides in the provision of adjustable impedance means in the aforementioned shunt path, whereby the amplitude of a supervisory current transmitted over the line in its quiescent condition may be selectively varied to give an alarm or other desired indication at the exchange. The range of impedance variation may be quite broad but should not include values near zero and/or infinity where it is desired to have a separate indication of short and/or open line circuits in accordance with our aforementioned Patent No. 2,690,477.

The change in the alternating-current impedance of the line may be carried out, according to another feature of our invention, pursuant to a predetermined pattern which can be recognized at the exchange as indicating a particular condition or representing a specific message. This can be accomplished, for example, by varying the impedance in a periodic manner, at a selected one of several control frequencies, whereby the supervisory alternating current will be modulated by such control frequency which can be detected at the exchange in a suitable discriminator circuit. In order to enable the use of relatively elevated control frequencies, the variable impedance is preferably furnished in such case by a purely electric, non-mechanical device well known per se, such as a reactance tube, a transistor, or a saturable-core reactor.

The above and other objects and features of our invention will become more fully apparent from the following description of a specific embodiment with reference to the sole figure of the accompanying drawing.

In the drawing, where conventional elements not essential for an understanding of the invention have been omitted, there is shown a central office CO and an outlying subscriber station SS connected to the former over a line having two conductors L1, L2.

At the central office CO the conductors L1, L2 extend in the conventional manner to the windings of a line relay LR which is energized from a battery B1 when the line loop is closed at LC. Relay LR has three armatures, the intermediate one of which serves to repeat the dial pulses to a switching stage (not shown) according to well-known principles. The lowermost armature of this relay serves to energize, over an obvious circuit from battery B1, a slow-releasing relay SRR which keeps its armatures attracted during dialing and, by way of the upper two of said armatures, extends the conductors L1, L2 via D.-C. blocking condensers C4, C5, upper armatures and back contacts of a connecting relay CR to a pair of outgoing leads terminating at the first stage of an outgoing switch train, such as a line finder (not shown). Relay CR is adapted to be energized under the control of another subscriber or of the exchange operator, over conventional circuits not further illustrated, whenever the line L1, L2 is seized for an incoming call; when this relay operates, its two upper armatures extend the conductors L1, L2 by way of condensers C4, C5 and a pair of incoming leads L21, L22 to the final stage of an incoming switch train, such as a selector (not shown).

Bridged across the conductors L1, L2 at the subscriber station SS, in shunt with the contacts LC and D, is a reactive circuit comprising a variable condenser C1 in series with a first winding W1 of a saturable-core reactor SCR. A source of biasing current B2 is connected across a second winding W2 of the reactor, in series with a current-limiting resistor R, and a third reactor winding W3 is connected across the secondaries of two transformers TR1, TR2. The primaries of these transformers are connectable by way of respective switches SW1, SW2 to sources of different control frequencies FS1, FS2.

A radiation-measuring device RM at the subscriber station, e.g. a Geiger counter, has an output element here symbolized as a pointer P1 which controls the variable condenser C1 in accordance with the intensity of radiation received. A fuse F is inserted in conductor L1 to break the line loop in the event of intense heat resulting from a fire on the premises.

An oscillation generator OG at the central office is connected across the primary of a transformer TR3 in series with the lowermost armature and a back contact of each of relays CR and SRR. One secondary of this transformer is inserted in conductor L1. Another transformer TR4 has its primary inserted in conductor L2 and has its secondary connected across the grid-cathode circuit of a vacuum tube T1. Another secondary of transformer TR3 is similarly connected across the grid-cathode circuit of a second vacuum tube T2, by way of a network N which duplicates the attenuation and the phase shift to which the output of generator OG is subjected in passing from transformer TR3 to transformer TR4 over the line L1, L2 when the pointer P1 is in its zero position. The two tubes T1, T2 derive their grid bias from a battery B3 and their operating current from a battery B4 which is connected between their cathodes and a center tap on the primary of an output transformer TR5 bridged across the plates of the two tubes. The network T1, T2, TR5 thus forms a discriminator for alternating currents originating from oscillation generator OG.

The secondary of transformer TR5 works into an alternating-current meter RI whose pointer P2 is correlated with the pointer P1 of radiation meter RM and which, therefore, serves as a radiation indicator for substation SS. Extreme positions of both pointers are marked by two stops designated 0 and ∞, respectively. Stop ∞ of indicator RI is a conductive stud connected to a back contact of a break relay BR from whose armature a circuit is extended via a battery B5 and the winding of a slow-operating relay SOR back to pointer P2. Relay BR is energizable from battery B5 to ground by way of the uppermost armature and front contact line relay LR and, in parallel therewith, the next-to-lowest armature and front contact of relay CR. An indicating lamp IL is energized over a front contact of relay SOR, from battery B5, when this relay operates.

Bridged across the secondary of output transformer TR5 are a pair of series-resonant circuits tuned to the frequencies of sources FS1 and FS2 respectively. These circuits comprise a condenser C2 in series with the primary of a transformer TR6, and a condenser C3 in series with the primary of a transformer TR7. The secondaries of transformers TR6 and TR7 work into respective alarm devices A1, A2 by way of rectification networks RE1 and RE2. A further alarm device A3 is energizable from battery B5 over an armature and front contact of relay SOR.

The operation of the system shown in the drawing is as follows:

If the line L1, L2 is in its normal quiescent condition, switches SW1, SW2 are open and the output of radiation meter RM is low, the relative amplitudes of the oscillations from generator OG as applied to the inputs of tubes T1, T2 will be such that no current or only a small residual current flows in the secondary of output transformer TR5, which keeps the pointer P2 out of contact with its stop ∞ and prevents the actuation of alarm A3. Since the resonant circuits TR6, C2 and TR7, C3 are not tuned to the frequency of these oscillations, alarm devices A1, A2 will be inactive. The pointer P2 may assume a position similar to the one illustrated in the drawing, indicating absence of substantial radiation at the subscriber station SS.

When, under these conditions, the subscriber at station SS initiates a call and lifts handset H off the hook, line relay LR operates and energizes break relay BR while simultaneously opening the output circuit of generator OG; also, when the connector relay CR operates on an incoming call to seize the line L1, L2, the output circuit of the generator is broken and the relay BR is actuated. In either case, therefore, operation of relay SOR and, thereby, of alarm A3 will be prevented and the lighting of lamp IL indicates that the momentary position of pointer P2 is influenced by the transmission of a call over the line and should not be interpreted as an accurate measure of radiation at station SS.

If the radiation intensity as measured by device RM increases, pointer P1 is deflected to the right and raises the impedance of the shunt path by changing the capacitance of condenser C1, whereby the amplitude of the oscillations in the input of tube T1 is further decreased below that of the oscillations emanating from network N and a larger resultant current is induced in the secondary of transformer TR5. Pointer P2 is, accordingly, deflected in similar manner and a monitor at the central office may determine from its position that a danger condition exists at station SS.

If a fire at station SS melts the fuse F or an intruder rips the telephone off the wall, the input circuit of transformer TR4 is broken and pointer P2 is fully deflected into contact with stop ∞, thereby closing the energizing circuit for relay SOR and actuating the alarm A3 after a short interval.

In the absence of the aforementioned conditions, the subscriber at station SS may actuate the alarm device A1 by closing switch SW1 (e.g. for the purpose of calling police assistance) or the alarm device A2 by closing switch SW2 (e.g. in order to summon an ambulance). In either case there will be impressed upon the suitably biased reactor SCR the frequency of the corresponding source FS1 or FS2 and will modulate the output of oscillation generator OG as applied to tube OG, whereby a component of the same frequency will appear in the output of transformer TR5 and will be selected by the corresponding tuned circuit C2, TR6 or C3, TR7.

The foregoing instances are, of course, only illustrative of the manner in which the system of our invention may be utilized to transmit an alarm or some other message. If the frequency of generator OG is sufficiently high, the same may also be modulated in the aforedescribed manner to transmit voice frequencies. It will, of course, be understood that the impedance of the shunt path C1, W1 should be kept sufficiently high to prevent undue attenuation of speech currents and distortion of dialing pulses under all normal operating conditions.

Finally, it may be mentioned that the system illustrated in the drawing is similar to the one shown in Fig. 2 of our aforementioned Patent No. 2,690,477 and, like the latter, will not respond to short-circuit conditions of the line since in that case the line relay LR will operate and inactivate the alarm. Where such response is desired, however, the system may be readily modified to include a bridge circuit along with means for rebalancing same to test for normal closure of the line loop as fully disclosed in said patent and shown in Fig. 1 thereof, with the input circuit of tube T1 of the present disclosure connected across bridge diagonal II, IV in substantially the same manner as is the input circuit of tube T in said Fig. 1. With a loop inductance XL1 as shown in the patent connected in series with contact LC, the value of the variable reactances C1, W1 should then be such that the line termination at station SS will always represent a finite alternating-current impedance; also, under these circumstances, the impedance of network N should be such that a residual current will always flow through the indicator RI unless the line is short-circuited at station SS, whereby the pointer P2 will occupy an extreme left-hand alarm position (except under conditions causing a lighting of lamp IL) only to indicate such short circuit. The above and other modifications and adaptations will be readily apparent to persons skilled in the art and are deemed to be embraced within the scope of our invention as defined in the statement of claims hereunto appended.

We claim:

1. In a communication system, in combination, a central station, an outlying station, a two-wire message-transmission line extending between said central station and said outlying station, a reactive shunt circuit bridged across said line at said outlying station, a source of alternating current at said central station, circuit means for applying current from said source to one of the wires of said line, said shunt circuit offering substantially infinite resistance to direct current but providing a path of finite impedance for said alternating current, means responsive to a predetermined ambient condition for selectively varying the alternating-current impedance of said path within a range of values representative of normal line conditions, call-responsive means operable upon the transmission of a message over said path, discriminator means at said central station connected to the other of said wires for determining the intensity of said alternating current as transmitted over said line, alarm means controlled by said discriminator means for operation in response to deviation of said current intensity beyond a range of normal values corresponding to said range of impedance values, means controlled by said call-responsive means for inactivating said alarm means during message transmission, and means controlled by said discriminator means for indicating variations in said current intensity within said range of normal values.

2. The combination according to claim 1, wherein said discriminator means comprises a comparison circuit having a first input connected to said other wire and a second input connected to said source.

3. The combination according to claim 2, wherein said second input includes circuit means substantially duplicating the attenuation and phase shift of said line for a predetermined reference value of said alternating-current impedance.

4. In a communication system, in combination, a central station, an outlying station, a two-wire line extending between said central station and said outlying station, a reactive shunt circuit bridged across said line at said outlying station, a source of alternating current at said central station, circuit means for applying current from said source to one of the wires of said line, said shunt circuit offering substantially infinite resistance to direct current but providing a path of finite impedance for said alternating current, variable impedance means in said shunt circuit, control means at said outlying station for selectively adjusting said variable impedance means, discriminator means at said central station connected to the other of said wires for determining the intensity of said alternating current as transmitted over said line, and indicator means controlled by said discriminator means in response to the operation of said control means, said control means including means for rhythmically varying the impedance of said variable impedance means at a predetermined frequency, said indicator means including a detector circuit responsive to said frequency.

5. The combination according to claim 4, wherein said control means includes a radiation-responsive instrument.

6. The combination according to claim 4, wherein said variable impedance means includes a saturable-core reactor.

7. In a communication system, in combination, a subscriber station, an exchange, a two-wire line extending between said station and said exchange, a reactive shunt circuit bridged across said line at said station, a source of alternating current at said exchange, circuit means for applying current from said source to one of the wires of said line, said shunt circuit forming part of a line termination of finite alternating-current impedance at said station, control means for varying said impedance in accordance with changes in a predetermined ambient condition at said station, discriminator means at said exchange connected to the other of said wires for determining the intensity of said alternating current as transmitted over said line, monitoring means controlled by said discriminator means for indicating said changes in said ambient condition, supervisory means at said exchange responsive to the initiation of message transmission over said line, and means controlled by said supervisory means for indicating inoperativeness of said monitoring means during said message transmission.

8. In a communication system, in combination, a central station, an outlying station, a two-wire line extending between said central station and said outlying station, a reactive shunt circuit bridged across said line at said outlying station, a source of alternating current at said central station, circuit means for applying current from said source to one of the wires of said line, said shunt circuit offering substantially infinite resistance to direct current but providing a path of finite impedance for said alternating current, variable impedance means in said shunt circuit, control means at said outlying station for selectively adjusting said variable impedance means, discriminator means at said central station connected to the other of said wires for determining the intensity of said alternating current as transmitted over said line, and indicator means controlled by said discriminator means in response to the operation of said control means, said control means including a plurality of means for rhythmically varying the impedance of said variable impedance means at any one of a plurality of predetermined frequencies, said indicator means including a plurality of detector circuits respectively responsive to said frequencies.

References Cited in the file of this patent

UNITED STATES PATENTS

| | | |
|---|---|---|
| 2,091,104 | Petersen et al. | Aug. 24, 1937 |
| 2,183,725 | Seeley | Dec. 19, 1939 |
| 2,334,704 | Hilferty | Nov. 23, 1943 |
| 2,581,056 | Walmsley et al. | Jan. 1, 1952 |